United States Patent
Inoue et al.

(10) Patent No.: US 7,370,952 B2
(45) Date of Patent: May 13, 2008

(54) INK, AND, INKJET RECORDING PROCESS, INK CARTRIDGE, RECORDING UNIT, AND INKJET RECORDING APPARATUS USING THE INK

(75) Inventors: Tomohiro Inoue, Kanagawa (JP); Kiyofumi Nagai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 203 days.

(21) Appl. No.: 10/490,181

(22) PCT Filed: Sep. 20, 2002

(86) PCT No.: PCT/JP02/09658

§ 371 (c)(1),
(2), (4) Date: Aug. 30, 2004

(87) PCT Pub. No.: WO03/027197

PCT Pub. Date: Apr. 3, 2003

(65) Prior Publication Data

US 2005/0007433 A1    Jan. 13, 2005

(30) Foreign Application Priority Data

Sep. 21, 2001 (JP) ............................. 2001-289435
Nov. 2, 2001 (JP) ............................. 2001-337368

(51) Int. Cl.
*G01D 11/00* (2006.01)
(52) U.S. Cl. .................... 347/100; 347/95; 523/160
(58) Field of Classification Search ................ 347/100, 347/95, 96, 101; 106/31.6, 31.13, 31.27; 523/160
See application file for complete search history.

(56) References Cited

U.S. PATENT DOCUMENTS

| | | | |
|---|---|---|---|
| 4,647,310 A | 3/1987 | Shimada et al. | |
| 4,711,668 A | 12/1987 | Shimada et al. | |
| 4,793,860 A | 12/1988 | Murakami et al. | |
| 5,175,568 A | 12/1992 | Oyamaguchi et al. | |
| 5,339,138 A | 8/1994 | Mishima et al. | |
| 5,400,065 A | 3/1995 | Tomono et al. | |
| 5,431,720 A | 7/1995 | Nagai et al. | |
| 5,462,592 A | 10/1995 | Murakami et al. | |

(Continued)

FOREIGN PATENT DOCUMENTS

JP          08041398          2/1996

(Continued)

OTHER PUBLICATIONS

Oct. 27, 2004 Communication and European Search Report in connection with European Application No. EP 02 76 7984 which corresponds to the above-identified application.

*Primary Examiner*—Manish S. Shah
(74) *Attorney, Agent, or Firm*—Cooper & Dunham LLP

(57) ABSTRACT

A water-based ink containing a surface treated pigment as a coloring material, a water-soluble organic solvent, water, both for dispersing the pigment, an organic pH buffer selected from Good's buffers, and a compound selected from aminopropanediol derivatives. This water-based ink has a high storage stability which exhibits reduced change in pH, in particular, reduced decrease of pH during the storage. Due to this, it is possible to provide a highly durable inkjet recording apparatus wherein dissolution of the member constituting the printer system that comes in contact with the ink is prevented, and a recording process.

8 Claims, 3 Drawing Sheets

U.S. PATENT DOCUMENTS

| | | | |
|---|---|---|---|
| 5,514,208 A | 5/1996 | Nagai et al. | |
| 5,622,550 A | 4/1997 | Konishi et al. | |
| 5,626,655 A | 5/1997 | Pawlowski et al. | |
| 5,658,376 A * | 8/1997 | Noguchi et al. | 347/100 |
| 5,670,284 A | 9/1997 | Kishi et al. | |
| 5,709,737 A | 1/1998 | Malhotra et al. | |
| 5,736,286 A | 4/1998 | Kaneko et al. | |
| 5,769,957 A | 6/1998 | Murakami et al. | |
| 5,810,915 A | 9/1998 | Nagai et al. | |
| 5,830,264 A * | 11/1998 | Fujioka et al. | 347/100 |
| 5,879,439 A | 3/1999 | Nagai et al. | |
| 5,882,390 A | 3/1999 | Nagai et al. | |
| 5,969,005 A * | 10/1999 | Yamashita et al. | 347/100 |
| 5,969,780 A | 10/1999 | Matsumoto et al. | |
| 5,972,082 A | 10/1999 | Koyano et al. | |
| 5,977,207 A * | 11/1999 | Yui et al. | 523/160 |
| 5,993,524 A | 11/1999 | Nagai et al. | |
| 6,068,953 A | 5/2000 | Matsumoto et al. | |
| 6,120,589 A | 9/2000 | Bannai et al. | |
| 6,176,913 B1 * | 1/2001 | Kasperchik et al. | 106/31.48 |
| 6,231,652 B1 | 5/2001 | Koyano et al. | |
| 6,261,349 B1 | 7/2001 | Nagai et al. | |
| 6,414,732 B1 | 7/2002 | Matsumoto et al. | |
| 6,432,184 B1 * | 8/2002 | Malhotra et al. | 106/31.43 |
| 6,613,136 B1 | 9/2003 | Arita et al. | |
| 6,637,875 B2 | 10/2003 | Kaneko et al. | |
| 6,648,464 B1 * | 11/2003 | Parazak | 347/100 |
| 6,688,737 B2 | 2/2004 | Nagai et al. | |
| 2001/0030678 A1 * | 10/2001 | Katsuragi et al. | 347/101 |
| 2002/0002930 A1 | 1/2002 | Yamashita et al. | |
| 2002/0083866 A1 | 7/2002 | Arita et al. | |
| 2002/0096085 A1 | 7/2002 | Gotoh et al. | |
| 2003/0010252 A1 | 1/2003 | Arita et al. | |
| 2003/0064206 A1 | 4/2003 | Koyano et al. | |
| 2003/0107632 A1 | 6/2003 | Arita et al. | |

FOREIGN PATENT DOCUMENTS

| | | |
|---|---|---|
| JP | 2002173621 | 6/2002 |
| WO | 02102906 | 12/2002 |
| WO | 03026899 | 4/2003 |

* cited by examiner

INK, AND, INKJET RECORDING PROCESS, INK CARTRIDGE, RECORDING UNIT, AND INKJET RECORDING APPARATUS USING THE INK

BACKGROUND OF THE INVENTION

1. Field of Invention

The present invention relates to a recording liquid adapted for use in inkjet recording, and in particular, to a recording liquid which is useful in forming images on so-called plain paper. Such recording liquid may also be used as a water-based ink composition for water based writing instruments, recording instruments, and pen plotters.

2. Description of the Related Art

A number of investigations have been conducted in recent years on inkjet printers to thereby improve printing properties on a plain paper, and in particular, to improve color-fastness to water and light. As a consequence, inkjet printers and plotters adapted for use with an ink including a pigment for the coloring material are now commercially available. These printers and plotters, however, are associated with the problem of insufficient reliability, for example, clogging, compared to the machine using a dye ink. This problem is particularly notable when a highly permeable solvent is added to the ink for controlling wettability, and the pigment often became aggregated as a result of change in the nature of the dispersant.

In view of such situation, U.S. Pat. No. 5,571,311 and Japanese Patent Application Laid-Open JP-A) No. 10-510862 propose an ink having improved dispersibility, stability after dispersion, and reliability by surface treating a carbon black with a compound having diazonium group, and introducing carboxylic acid and sulfonic acid as a functional group. U.S. Pat. No. 5,922,118 discloses an organic pigment for use in a color ink wherein the carbon black has been surface treated and introduced with carboxyl group and sulfonyl group as in the case of U.S. Pat. No. 5,571,311 or the like. JP-A No. 10-273606 discloses an organic pigment which has been oxidized by using sulfamic acid, and JP-A No. 11-246807 discloses an organic pigment wherein sulfonic group has been introduced by Friedel-Crafts reaction by using a sulfonating agent.

The pH of a water soluble ink is generally adjusted for the purpose of preventing clogging of the nozzle and corrosion of the members that come in contact with the ink. The surface treated pigments as described above, however, are associated with the problem that they change the pH, in particular, lower the pH when the pigments are exposed to the change in temperature and other environmental factors or as the time lapses despite their improved dispersibility and stability after the dispersion. Such change in the pH resulted in the corrosion and erosion of various constituent members including the head having an ink supplying means and a liquid chamber including members comprising silicon or glass and/or metal such as nickel, SUS, or the like, and this, in turn, adversely affected the ejection properties.

In view of the situation as described above, JP-A No. 04-226175 discloses an ink wherein a sodium borate, N-tris (hydroxy)-methyl-2-aminoethanesulfonic acid, N,N-bis(hydroxylethyl)glycine, triethanolamine or tris(hydroxymethyl) aminoethane has been added as a pH buffer with the particular dye for the purpose of stabilizing the pH of the ink. JP-A No. 08-41398 discloses an ink containing at least one compound selected from 2-(cyclohexyl-amino)ethane-sulfonic acid, 3-N-cyclohexylamino-2-hydroxypropane-sulfonic acid, 3-N-cyclohexylaminopropane-sulfonic acid, and glycine with an alkaline metal hydroxide or carbonate, wherein pH has been adjusted to the range of 9.5 to 9.8, and which exhibits small pH decrease after storing at 60° C. for 1 week. JP-A No. 09-268267 discloses an ink containing a dye and 2-amino-1,3-propanediol derivative as an organic weak base, wherein the pH has been adjusted to the range of 8 to 10. Since these inks contain dyes having buffering capability, the pH can be kept in the range of 9 to 9.3 even after storing at 60° C.

With regard to the pigment-based ink, JP-A No. 04-149286 discloses a pigment-based ink using a dispersant wherein a carbon black having a pH of up to 6 is used with a buffer to adjust the pH to the range of higher than 6 to less than 8. In the case of a pigment-based ink, pigment often aggregates at a high ion strength, and therefore the pH adjusters used in the dye-based inks as described above cannot simply be applied to the pigment ink, and such application is particularly difficult in the case of an ink employing a surface treated pigment.

SUMMARY OF THE INVENTION

The present invention was completed in view of the situation as described above, and an object of the present invention is to provide an improved ink containing a surface treated pigment for the coloring material, and in particular, a water-based ink having a high storage stability which exhibits reduced change in pH, in particular, reduced decrease of pH during the storage. Another object of the present invention is to provide a highly durable inkjet recording apparatus wherein dissolution of the member constituting the printer system that comes in contact with the ink is prevented, and a recording process.

DETAILED DESCRIPTION OF THE INVENTION

Figure 1:
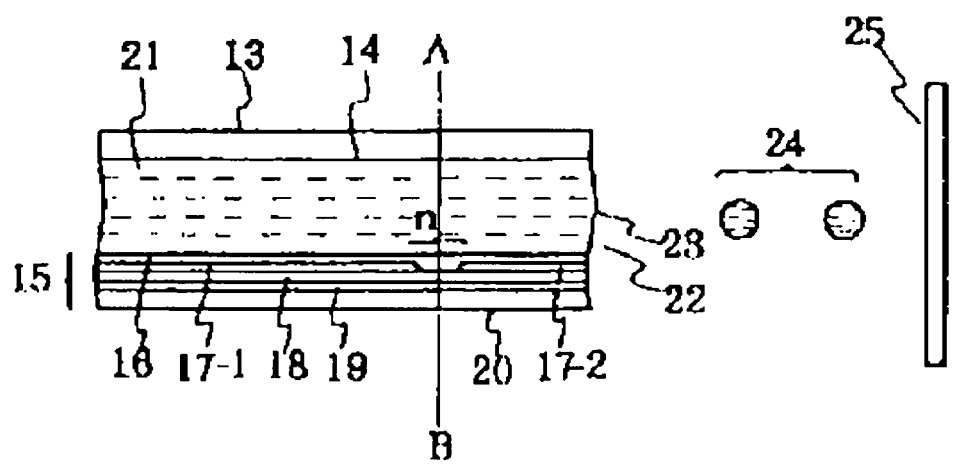
FIG. 1 is a view showing an example of the head which is the main part of the inkjet recording apparatus according to the present invention.

In the case of the ink using the carbon black, the pH decrease is estimated to be caused by the influence of acid originating from impurities in the carbon and the materials remaining unreacted. The mechanism, however, has not been found out. This acid generation which may result in the impaired durability of the members that come in contact with the ink is a serious problem since such decrease in the pH is prominent at a high temperature and the ink often reaches a high temperature during the transportation.

In view of such situation, attempts have been made to suppress the pH decrease caused by the acid generation in the ink by using a buffer. Addition of a borate which has been known in the art, however, resulted in the aggregation due to the decrease of ζ potential which is estimated to have been caused by the ion adsorption.

This, in turn, means that the pH buffering capacity should be imparted without causing adsorption on the pigment surface. The inventors of the present invention have made an extensive investigation to find an adequate buffer, and the present invention has been completed as result of such investigation.

More specifically, the inventors of the present invention found that, when an organic pH buffer selected from Good's buffers and a basic organic compound selected from aminopropanediol derivatives are added to a water soluble ink having the surface treated pigment dispersed by using a water soluble organic solvent and water, the thus provided ink will exhibit high storage stability and reduced pH decrease. The present invention does not adversely affect the dispersibility of the surface treated particles, and the former component contributes for the pH buffering capacity while the latter component adjusts the pH of the ink to the desired pH and is likely to be contributing for the pH buffering capacity as well.

The present invention is particularly effective when the organic pH buffer selected from the Good's buffer is N-cyclohexyl-3-aminopropanesulfonic acid or N-cyclohexyl-2-hydroxy-3-aminopropanesulfonic acid, when the aminopropanediol derivative is 1-amino-2,3-propanediol, 1-methylamino-2,3-propanediol, or 1-amino-2-ethyl-2,3-propanediol, when the ink has a pH of 8 to 11, and when the surface treated pigment is a self-dispersing pigment. Furthermore, the merit of the present invention is most prominent when it is used with an inkjet printer wherein at least a part of the member constituting liquid chamber, fluid resistor, vibration plate, or nozzle is formed of a material containing silicon or nickel since reduction in pH gives serious effects on the dissolution of the components constituting such member. Therefore, the present invention realizes remarkable improvements in the ink cartridge, inkjet recording apparatus, and inkjet recording process using the ink of the present invention.

The present invention provides an ink formulation which enables providing an inkjet system wherein reliability has been improved, by resolving various difficulties associated with the surface treated pigments, which have a better reliability than conventional pigment inks where the pigment is dispersed by using a dispersant.

The ink of the present invention is adapted for use with any printer including the one utilizing the pressure exerted by PZT, the one wherein the ink is ejected by the vibration plate deformed by electrostatic force, and the drop-on-demand inkjet printer wherein the ink droplet is ejected by the bubble generated by the heating of the liquid, and also the one operated by the so called "charge control process" wherein the ink is simultaneously charged and vibrated by PZT. Due to the high reliability of the ink of the present invention, stable ink ejection is enabled even from a nozzle with a diameter as small as 20 μm or less.

First, Good's buffer used in the present invention is described. Good's buffer is an organic buffer used in the field of biochemistry, and typical structures are as described below.

[Good's Buffers]

ACES

Chemical name: N-(2-acetamido)-2-aminoethanesulfonic acid $$H_2NCOCH_2NHCH_2CH_2SO_3H \tag{1}$$

ADA

Chemical name: N-(2-acetamido)iminodiacetic acid $$H_2NCOCH_2N(CH_2COOH)_2 \tag{2}$$

BES

Chemical name: N, N-bis(2-hydroxyethyl)-2-aminoethanesulfonic acid $$(HOCH_2CH_2)_2NCH_2CH_2SO_3H$$

Bicine

Chemical name: N, N-bis(2-hydroxyethyl)glycine $$(HOCH_2CH_2)_2NCH_2COOH \tag{3}$$

Bis-Tris

Chemical name: bis(2-hydroxyethyl)iminotris(hydroxymethyl)methane $$(HOCH_2)_3CN(CH_2CH-OH)_2 \tag{4}$$

CAPS

Chemical name: N-cyclohexyl-3-aminopropanesulfonic acid

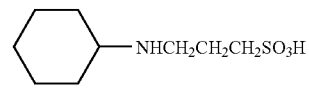

(5)

CAPSO

Chemical name: N-cyclohexyl-2-hydroxy-3-aminopropanesulfonic acid

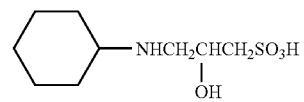

(6)

CHES

Chemical name: N-cyclohexyl-2-aminoethanesulfonic acid

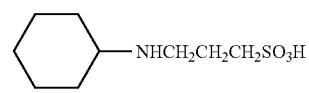

(7)

DIPSO

Chemical name: 3-[N,N-bis(2-hydroxyethyl)amino]-2-hydroxypropanesulfonic acid

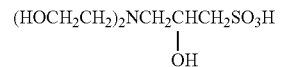

(8)

EPPS
Chemical name: 3-[4-(2-hydroxyethyl)-1-piperazinyl]propanesulfonic acid

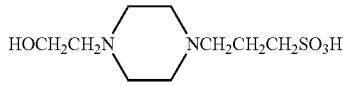
(9)

HEPES
Chemical name: 2-[4-(2-hydroxyethyl)-1-piperazinyl]ethanesulfonic acid

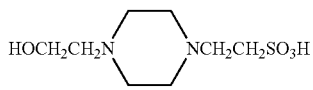
(10)

HEPPSO
Chemical name: 2-hydroxy-3-[4-(2-hydroxyethyl)-1-piperazinyl]propanesulfonic acid, monohydrate

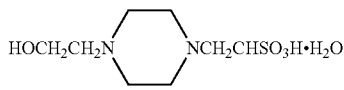
(11)

MES
Chemical name: 2-morpholinoethanesulfonic acid, monohydrate

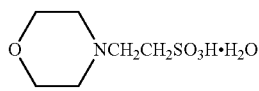
(12)

MOPS
Chemical name: 3-morpholinopropanesulfonic acid

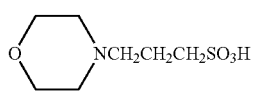
(13)

MOPSO
Chemical name: 2-hydroxy-3-morpholinopropanesulfonic acid

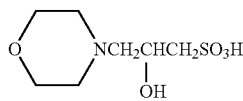
(14)

PIPES
Chemical name: piperazine-1,4-bis(2-ethanesulfonic acid)

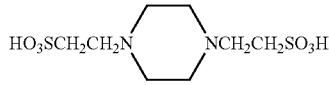
(15)

POPSO
Chemical name: piperazine-1,4-bis(2-hydroxy-3-propanesulfonic acid), dihydrate

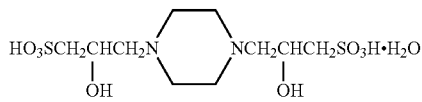
(16)

TAPS
Chemical name: N-tris(hydroxymethyl)methyl-3-aminopropanesulfonic acid $(HOCH_2)_3CNHCH_2CH_2CH_2SO_3H$ (17)

TAPSO
Chemical name: 2-hydroxy-N-tris(hydroxymethyl)methyl-3-aminopropane sulfonic acid

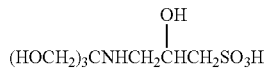
(18)

TES
Chemical name: N-tris(hydroxymethyl)methyl-2-aminoethanesulfonic acid $(HOCH_2)_3CNHCH_2CH_2SO_3H$ (19)

Tricine
Chemical name: N-[tris(hydroxymethyl)methyl]glycine $(HOCH_2)_3CNHCH_2COOH$ (20)

Of the Good's buffers as mentioned above, the preferred are CHES, CAPS, CAPSO, TAPS, Bicine, and Tricine, and the most preferred is CHES.

The Good's buffer is added at an amount of 0.001% to 5.0% by weight, preferably at 0.005% to 1.0% by weight, and most preferably at 0.01% to 0.1% by weight.

Next, the aminopropanediol derivative used in the present invention id described. Examples of preferable aminopropanediol derivatives include, but are not limited to, 1-methyl-amino-2,3-propanediol, 1-amino-2,3-propanediol, 1-amino-2-ethyl-2,3-propanediol, 2-amino-2-methyl-1,3-propanediol, 2-amino-2-ethyl-1,3-propanediol, and 2-amino-2,3-propanediol.

The preferred is 2-amino-2-ethyl-1,3-propanediol, 2-amino-2-methyl-1,3-propanediol, and 2-amino-2,3-propanediol, and the especially preferred is 2-amino-2-ethyl-1,3-propanediol. The aminopropanediol derivative is added preferably at an amount of 0.01% to 10% by weight, and more preferably 0.1% to 2.0% by weight.

Exemplary pigments which may be used in the present invention include organic pigments such as azo pigments, phthalocyanine pigments, anthraquinone pigments, dioxadine pigments, indigo pigments, thioindigo pigments, perylene pigments, isoindolenone pigments, aniline black, azomethine pigments, rhodamine B lake pigments, carbon black; and inorganic pigment such as iron oxide, titanium oxide, calcium carbonate, barium sulfate, aluminum hydroxide, barium yellow, iron blue, cadmium red, chrome yellow, and metal powder.

More specifically, exemplary pigments which may be used for a black ink include carbon blacks such as furnace black, lampblack, acetylene black, channel black, and carbon black (C.I. Pigment black 7), and metals such as copper oxide, iron oxide (C.I. Pigment black 11), and titanium oxide, and organic pigments such as aniline black (C.I. Pigment black 1).

Exemplary pigments which may be used for a color ink include, in the case of yellow ink, C.I. Pigment yellow 1 (fast yellow G), 3, 12 (disazo yellow AAA), 13, 14, 17, 23, 24, 34, 35, 37, 42 (yellow iron oxide), 53, 55, 74, 81, 83 (disazo yellow HR), 95, 97, 98, 100, 101, 104, 108, 109, 110, 117, 120, 128, 138, 150, and 153.

Exemplary pigments which may be used for a magenta ink include C.I. Pigment Red 1, 2, 3, 5, 17, 22 (Brilliant Fast Scarlet), 23, 31, 38, 48:2 (Permanent Red 2B(Ba)), 48:2 (Permanent Red 2B(Ca)), 48:3 (Permanent Red 2B(Sr)), 48:4 (Permanent Red 2B(tMn)), 49:1, 52:2, 53:1, 57:1 (Brilliant Carmine 6B), 60:1, 63:1, 63:2, 64:1, 81 (Rhodamine 6G Lake), 83, 88, 92, 101 (red oxide), 104, 105, 106, 108 (cadmium red), 112, 114, 122 (dimethylquinacridon), 123, 146, 149, 166, 168, 170, 172, 177, 178, 179, 185, 190, 193, 209, and 219.

Exemplary pigments which may be used for a cyan ink include C.I. Pigment blue 1, 2, 15 (copper phthalocyanine blue R), 15:1, 15:2, 15:3 (phthalocyanine blue G), 15:4, 15:6 (phthalocyanine blue E), 16, 17:1, 56, 60, and 63.

Exemplary pigments which may be used for an ink of intermediate color include pigments that have been known for use in red, green, and blue inks, and such pigments may be used either alone or in combination of two or more.

In the present invention, a pigment which has been surface treated is used for the purpose of improving dispersibility and stability after the dispersion to thereby improve reliability. The type of the surface treatment is not particularly limited and any surface treatment known in the art may be employed.

With regard to the surface treatment of the pigment, typical surface treated pigments include self-dispersing pigments wherein dispersion of the pigment in water has been enabled by adding sulfonyl group, carboxyl group, or other functional group on the pigment surface; grafted pigments wherein dispersion of the pigment in water has been enabled by treating the pigment surface with the resin; and pigments wherein dispersion of the pigment in water has been enabled by incorporating the pigment in a microcapsule. In the present invention, intended effects are most prominently realized by the use of a self-dispersing pigment. The particle size of the pigment is not particularly limited. In the present invention, however, a pigment ink having a particle size distribution wherein particles with the particle size of 20 to 150 nm are most prevalent in terms of maximum particle number is preferred. Most preferably, the pigment may have a particle size of about 50 to 120 nm. When the particle size exceeds 150 nm, the recording liquid will suffer from insufficient stability of the pigment dispersion and insufficient stability of ejection of the recording liquid, inviting loss of image quality including image density. On the other hand, particle size of less than 20 nm may be favorable in view of the stability in the storage of the recording liquid and in the ejection of the ink while size reduction to such size and dispersion of the particles of such size would require complicated dispersion and classification procedures, rendering the economical production of the recording liquid difficult.

When a pigment dispersant is used in the present invention, any known dispersant used for an inkjet system may be used including polymeric dispersants and water soluble surfactants.

The ink of the present invention is most often produced by using water as its main component of solvent. The ink, however, may be produced by using a water soluble organic solvent, for example, in order to produce an ink having the desired properties, to prevent drying of the ink, or to improve dissolution stability of the ink.

Exemplary water soluble organic solvents include ethylene glycol, diethylene glycol, triethylene glycol, polyethylene glycol, polypropylene glycol, 1,5-pentanediol, 1,6-hexanediol, glycerin, 1,2,6-hexanetriol, 1,2,4-butanetriol, 1,2,3-butanetriol, petriol, and other polyhydric alcohols; ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propyleneglycol monoethyl ether, and other polyhydric alcohol alkylethers; ethylene glycol monophenyl ether, ethylene glycol monobenzyl ether, and other polyhydric alcohol arylethers; N-methyl-2-pyrrolidone, N-hydroxyethyl-2-pyrrolidone, 2-pyrrolidone, 1,3-dimethylimidazolidinone, ε-caprolactam and other nitrogen-containing heterocyclic compounds; formamide, N-methylformamide, N,N-dimethylformamide, and other amides; monoethanolamine, diethanolamine, triethanolamine, monoethylamine, diethylamine, triethylamine, and other amines; dimethylsulfoxide, sulfolane, thiodiethanol, and other sulfur-containing compounds; propylene carbonate, ethylene carbonate, γ-butyrolactone, and the like, which may be used alone or in combination of two or more with water.

Among these, the most preferred are diethylene glycol, thiodiethanol, polyethylene glycol 200 to 600, triethylene glycol, glycerin, 1,2,6-hexanetriol, 1,2,4-butanetriol, petriol, 1,5-pentanediol, N-methyl-2-pyrrolidone, N-hydroxyethylpyrrolidone, 2-pyrrolidone, and 1,3-dimethyl-imidazolidinone, use of which prevents clogging caused by drying of the ink, namely, loss of ejection properties by the evaporation of water content, and improves dissolution stability of the ink of the present invention.

The ink of the present invention may also include other additives known in the art in addition to the colorants and the solvent as described above.

A penetrant may be added for the purpose of reducing surface tension of the ink. Exemplary penetrants include polyhydric alcohols such as 2,2,4-trimethyl-1,3-pentanediol, and 2-ethyl-1,3-hexanediol; alkyl and aryl ethers of a polyhydric alcohol such as diethylene glycol monophenyl ether, ethylene glycol monophenyl ether, ethylene glycol monoallyl ether, diethylene glycol monophenyl ether, diethylene glycol monobutyl ether, propyleneglycol monobutyl ether, and tetraethylene glycol chlorophenyl ether; and lower alcohols such as polyoxyethylene polyoxypropylene block copolymer, fluorosurfactant, ethanol, and 2-propanol.

The ink may further have a surfactant added thereto for the purpose of adjusting surface tension of the ink to thereby improve penetration of the ink into the material to be recorded, and also, for the purpose of improving the ability of the ink to wet the head member of the inkjet printer to thereby improve stability upon ink ejection.

Exemplary anionic surfactants include alkylaryl or alkylnaphthalene sulfonate salt, alkylphosphate salt, alkylsulfate salt, alkylsulfonate salt, alkylether sulfate salt, alkylsulfosuccinate salt, alkylester sulfate salt, alkylbenzene sulfonate salt, alkyldiphenyl ether disulfonate salt, alkylaryl ether phosphate salt, alkylaryl ether sulfonate salt, alkylaryl ether ester sulfate salt, olefin sulfonate salt, alkane olefin sulfonate salt, alkane olefin sulfonate salt, polyoxyethylene alkylether phosphate salt, polyoxyethylene alkylether sulfate salt, ether carboxylate, sulfosuccinic acid salt, α-sulfofatty acid ester, fatty acid salt, condensation product of a higher fatty acid and an amino acid, and naphthenate salt. Exemplary cationic surfactants include alkylamine salt, dialkylamine salt, fatty acid amine salt, banzalkonium salt, quarternary ammonium salt, alkylpyridinium salt, imidazolinium salt, sulfonium salt, and phosphonium salt.

Exemplary nonionic surfactants include polyoxyethylene alkylether, polyoxyethylene alkylallyl ether, polyoxyethylene alkylphenyl ether, polyoxyethylene glycol ester, polyoxyethylene fatty acid amide, polyoxyethylene fatty acid ester, polyoxyethylene polyoxypropylene glycol, glycerin ester, sorbitan ester, sucrose ester, polyoxyethylene ether of a glycerin ester, polyoxyethylene ether of a sorbitan ester, polyoxyethylene ether of a sorbitol ester, fatty acid alkanol amide, amine oxide, polyoxyethylenealkylamine, glycerin fatty acid ester, sorbitane fatty acid ester, polyoxyethylene sorbitane fatty acid ester, polyoxyethylene sorbitol fatty acid ester, and alkyl(poly)glycoxide.

Exemplary amphoteric surfactants include imidazoline derivatives such as imidazolinium betaine, dimethylalkyl lauryl betaine, alkylglycine, and alkyldi(aminoethyl)glycine.

In the ink composition, such surfactant may be added at an amount of 0.01% by weight to 5.0% by weight, and preferably 0.5% by weight to 3% by weight. Addition of the surfactant at an amount of less than 0.01% by weight will not achieve the intended effects while addition of more than 5.0% by weight will result in excessive permeation of the ink into the medium to be recorded to invite decrease in the image density and occurrence of strike through. The surfactant as described above may be used alone or in combination of two or more.

The ink composition may also include other additives such as antiseptic or an antifungal agents, rust preventive agent, water soluble UV absorber, and water soluble IR absorber.

Exemplary antiseptic or an antifungal agents include 1,2-benzisothiazoline-3-one, sodium benzoate, sodium dehydroacetate, sodium sorbate, sodium pentachlorophenol, and sodium 2-pyridinethiol-1-oxide. Exemplary rust-preventive agents include acid sulfite, sodium thiosulfate, ammonium thiodiglycolate, diisopropyl ammonium nitrite, pentaerythritol tetranitrate, dicyclohexylammonium nitrite.

REFERENCE EXAMPLE 1

Carbon Black 1—Carbon Black Treated with Hypochlorous Acid 300 g of a commercially available acidic carbon black at pH 2.5 (Monarch 1300 (product name) manufactured by Cabot) was mixed with 1000 ml of water, and 450 g of sodium hypochlorite (effective chlorine concentration, 12%) was added dropwise. The mixture was stirred at 100° C. to 105° C. for 8 hours. To this mixture was further added 100 g of sodium hypochlorite (effective chlorine concentration, 12%), and the mixture was dispersed in a horizontal dispersion mill for 3 hours. After diluting the resulting slurry to 10 folds with water, the pH of the dispersion was adjusted with lithium hydroxide, and the dispersion was desalted and concentrated to an electric conductivity of 0.2 mS/cm with an ultrafilter membrane to produce a carbon black dispersion having a pigment concentration of 15%. Coarse particles were removed by centrifugation, and dispersion was filtered with a 1 μm Nylon filter to produce carbon black dispersion 1.

REFERENCE EXAMPLE 2

Carbon Black 2—Carbon Black Treated with a Sulfonating Agent 150 g of a commercially available carbon black pigment ("Printex#85" manufactured by Degussa AG) was mixed with 400 ml of sulfolane, and microdispersed in a bead mill. To the mixture was added 15 g of amidosulfonic acid, and the mixture was stirred at 140 to 150° C. for 10 hours. The resulting slurry was added to 1000 ml of ion exchanged water and centrifuged at 12,000 rpm to produce a wet cake of surface treated carbon black. This carbon black wet cake was again dispersed in 2000 ml of ion exchanged water, and the pH was adjusted with lithium hydroxide. The dispersion was then desalted and concentrated with an ultrafilter membrane to produce a carbon black dispersion having a pigment concentration of 10%. The dispersion was filtered with a 1 μm Nylon filter to produce carbon black dispersion 2.

REFERENCE EXAMPLE 3

Carbon Black Dispersion 3—Dispersion of Carbon Black Treated with a Diazo Compound 100 g of a carbon black having a surface area of 230 m$^2$/g and DBP absorption of 70 ml/100 g and 34 g of p-amino-N-benzoic acid was mixed and dispersed in 750 g of water, and after adding 16 g of nitric acid dropwise, the mixture was stirred at 70° C. After 5 minutes, a solution of 11 g of sodium nitrite in 50 g of water was added, and stirring was continued for another 1 hour. The resulting slurry was diluted 10 folds, and centrifuged to remove coarse particles. After adjusting the pH with diethanolamine to pH 8 to 9, the dispersion was desalted and concentrated with an ultrafilter membrane to produce a carbon black dispersion having a pigment concentration of 15%. The dispersion was filtered with a 0.5 μm polypropylene filter to produce carbon black dispersion 3.

REFERENCE EXAMPLE 4

Carbon Black Dispersion 4—Dispersion of Carbon Black Treated with a Diazo Compound A solution containing 2 liters of water and 43 g of sulfanilic acid at about 75° C. was added to 202 g of a carbon black having a surface area of 230 m$^2$/g and DBP absorption of 70 ml/100 g. The mixture was cooled to room temperature with stirring, and 26.2 g of concentrated nitric acid was added. A solution of 20.5 g of sodium nitrite in water was also added. 4-sulfobenzenediazonium hydroxide inner salt was prepared and reacted with the carbon black. The dispersion system was stirred until the bubbling ended. The resulting slurry was diluted, and pH was adjusted with lithium hydroxide to pH 8 to 9. Coarse particles were removed by centrifugation, and the dispersion was desalted and concentrated with an ultrafilter membrane to produce a carbon black dispersion having a pigment concentration of 15%. The dispersion was filtered with a 1 μm polypropylene filter to produce carbon black dispersion 4.

REFERENCE EXAMPLE 5

Dispersions of Surface Treated Color Pigments
Yellow Dispersion 1, Magenta Dispersion 1, Cyan Dispersion 1

A pigment having carboxylic group introduced thereto was produced by using C.I. Pigment Yellow 128 for the yellow pigment and subjecting the pigment to low temperature plasma treatment. Dispersion of the thus treated pigment in ion exchanged water was desalted and concentrated with an ultrafilter membrane to produce a yellow pigment dispersion 1 having a pigment concentration of 15%.

Magenta pigment dispersion 1 having a pigment concentration of 15% was prepared in a similar manner by using C.I. Pigment Magenta 122 for the magenta pigment.

Cyan pigment dispersion 1 having a pigment concentration of 15% was prepared in a similar manner by using C.I. Pigment Cyan 15:3 for the cyan pigment.

Next, an example of the inkjet recording apparatus of the present invention which is adapted for use in the recording using the water-based pigment ink of the present invention is described. First, an example of the head which is the main part of the inkjet recording apparatus is explained by referring to FIG. 1 wherein a head utilizing thermal energy is depicted.

FIG. 1 is a cross-sectional view of a head (13) taken along its ink channel. The head (13) is produced by adhering a plate of glass, ceramic, silicon, plastic, or the like having a channel (nozzle) (14) for ink passage defined therein with a heater element substrate (15). The heater element substrate (15) may include a protective layer (16) formed form silicon oxide, silicon nitride, silicon carbide, or the like; electrodes (17-1) and (17-2) formed of aluminum, gold, an aluminum-copper alloy, or the like; a heat resistor layer (18) formed by material having a high melting point such as $HfB_2$, TaN, TaAl, or the like; a heat reservoir layer (19) formed of thermally oxidized silicon, aluminum oxide, or the like; and a substrate (20) formed by a material having good heat releasing properties such as silicon, aluminum, and aluminum nitride.

When electric pulse signal is applied to the electrodes (17-1) and (17-2) of the head (13), the region denoted by "n" in the heater element substrate (15) is rapidly heated, and bubbles are generated in the ink (21) of the portion in contact with this surface. This raises the pressure, and leads to the raise of meniscus (23), and ink (21) is ejected from nozzle (14) of the head. Ink droplets (24) are then ejected against the recording material (25) from the ejecting orifice (22).

Figure 2:
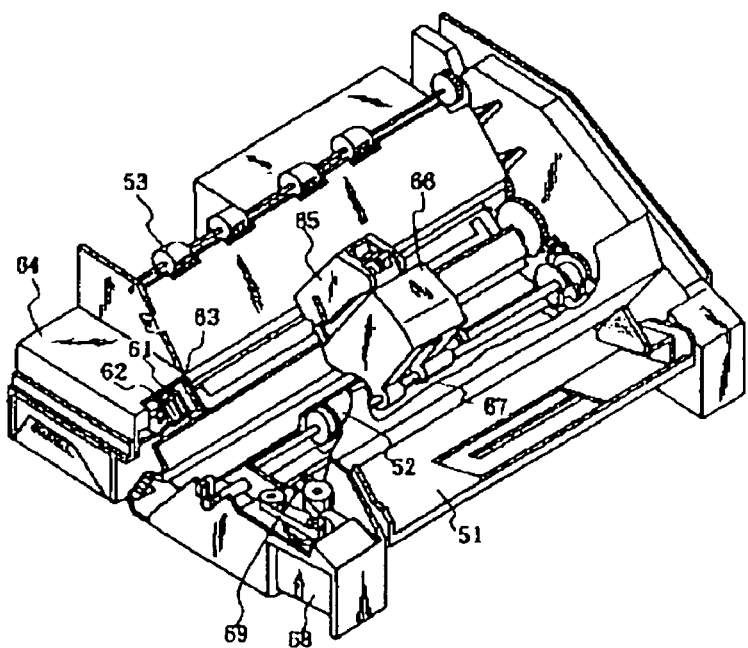
FIG. 2 is a view showing an example of the inkjet recording apparatus wherein the head of the present invention has been incorporated.

FIG. 2 shows an example of the inkjet recording apparatus having the head as described above incorporated therein. In FIG. 2, a blade (61) is the member which functions as a wiper member, and one end of the blade (61) is secured to and supported by a blade holding member. The blade (61), therefore, is in the form of a cantilever. The blade (61) is located at a position adjacent to recording area where the recording is accomplished by the recording head (65), and in this example, the blade (61) is held so that it projects into the moving path of the recording head (65).

A cap (62) for the covering projected face of the recording head (65) is located at a home position adjacent to the blade (61). The cap is configured so as to move in the direction perpendicular to the moving direction of the recording head (65) to be in contact with the ink orifice face for capping. An ink absorbing member (63) is provided adjacent to the blade (61), and this ink absorbing member (63) is held so that it projects into the moving path of the recording head (65) in a manner similar to the blade (61). The blade (61), the cap (62) and the ink absorbing member (63) constitute an orifice recovery section (64), and moisture, dusts, and the like located at the ink orifice face are removed by the blade (61) and the ink absorbing member (63).

The recording head (65) has an energy generating means for generating the energy used in the ink ejection, and ejects the ink onto the material to be recorded positioned opposite to the orifice face including the orifice, and a carriage (66) carries the recording head (65) and moves the recording head (65). The carriage (66) is slidably engaged with a guide axis (67), and a part of the carriage (66) is connected (not shown) to a belt (69) driven by a motor (68). Thus, the carriage (66) is capable of moving along the guide axis (67), and the recording head (65) can move in the recording area and its adjacent area.

The material to be recorded is inserted into a paper feed section (51), and a paper feeder roller (52) is driven by a motor (not shown). With this configuration, the material to be recorded can be fed to a position opposite to the orifice face of the recording head (65), and as the recording proceeds, paper is conveyed to a paper discharge section provided with a paper discharge roller (53). In the above configuration, when the recording head (65) returns to the home position at the end of the recording, the cap (62) of the orifice recovery section (64) stays back from the moving path of the recording head (65), whereas the blade (61) projects into the moving path, and as a result, the blade (61) wipes the orifice of the recording head (65).

When the orifice face of the recording head (65) is to be abutted and capped by the cap (62), the cap (62) moves and projects out into the moving path of the recording head. When the recording head (65) moves from the home position to the record starting position, the cap (62) and the blade (61) are at the same positions as the wiping as described above. Therefore, the orifice face of the recording head (65) is also wiped during this movement. The recording head moves to the home position not only at the end of recording or in the orifice recovery, but the recording head also moves to the home position adjacent to the recording area at a predetermined interval during the movement of the recording head for the recording purpose, and the orifice is also wiped during this movement.

Figure 3:
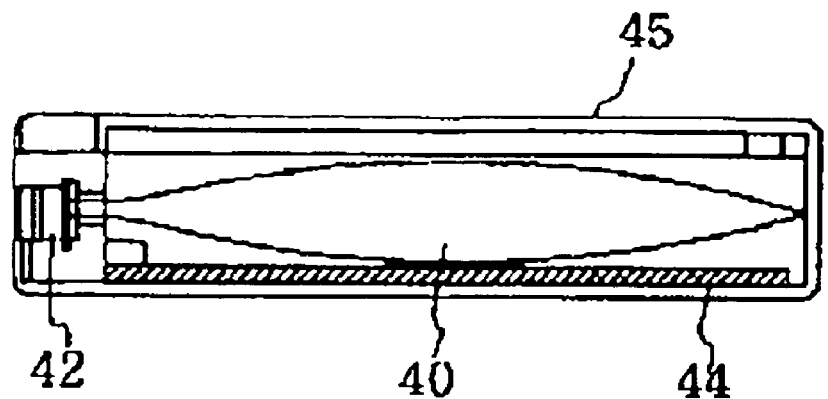
FIG. 3 is a view showing an example of the ink cartridge accommodating the ink of the present invention.

FIG. 3 is a view showing an example of an ink cartridge containing ink to be supplied to the recording head via an ink supplier member, for example, a tube. An ink reservoir (40) contains ink to be supplied, and is, for example, an ink bag, and a rubber stopper (42) is provided at the end of the ink reservoir (40). The ink in the ink bag (40) is supplied to the head by inserting a needle (not shown) through the stopper (42). An ink absorber member (44) receives the waste ink. The ink reservoir is preferably configured such that the surface that comes in contact with the ink is formed of polyolefins, and in particular polyethylene.

Figure 4:
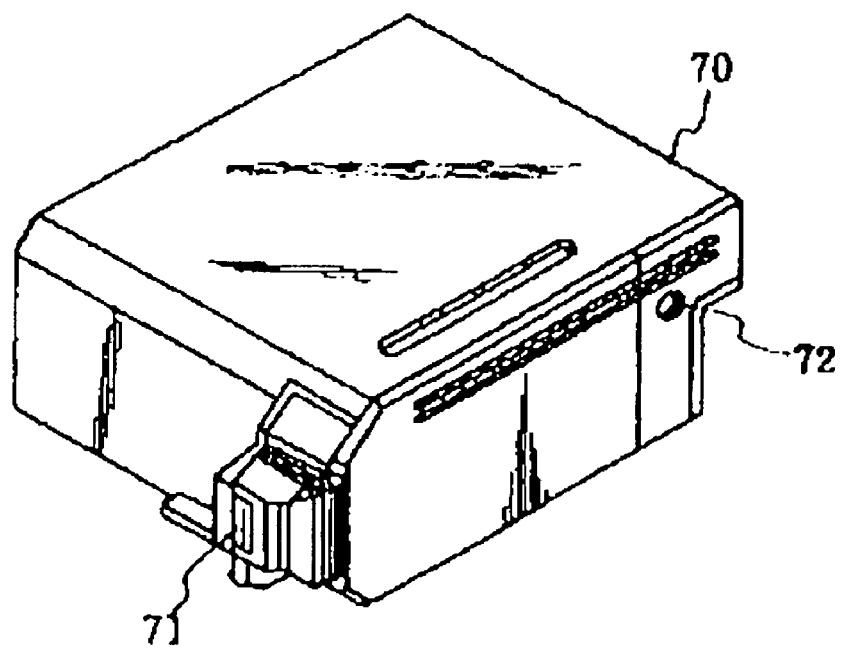
FIG. 4 is a view showing an example of the integrated unit of the recording apparatus according to the present invention.

In the inkjet recording apparatus used in the present invention, the head and the ink cartridge are not always configured as separate entities as described above, and they may be integrated as shown in FIG. 4. In FIG. 4, a recording unit (70) accommodates an ink reservoir containing the ink, and the ink reservoir may be an ink absorbing member. The ink in the ink absorber member is ejected in form of droplets from a head portion (71) having a plurality of orifices. In the present invention, the ink absorber member is preferably formed of polyurethane, cellulose, polyvinyl acetate, or a polyolefin based resin. Instead of using the ink absorber member, an ink bag provided with a spring in its inside may also be used for the ink reservoir. The recording unit is provided with an air communicating port (72) for communicating the interior of the unit with outer atmosphere. This recording unit (70) can be used instead of the recording head (65) shown in FIG. 2, and is detachably mounted on the carriage (66).

Figure 5:
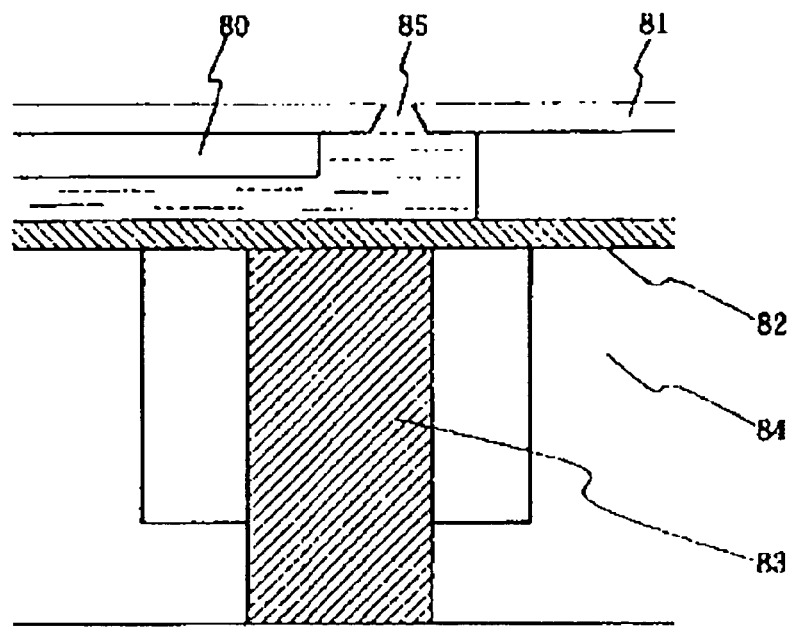
FIG. 5 is a view showing an example of the recording head which is the main part of the recording apparatus according to the present invention.

Next, an on-demand inkjet recording apparatus is described as a preferable example of the inkjet recording apparatus utilizing mechanical energy. This on-demand inkjet recording apparatus comprises a nozzle forming substrate having a plurality of nozzles defined therein, pressure generating elements arranged at positions opposing to each nozzle each comprising a piezoelectric material and a conductive material, and the ink which fills the area surrounding the pressure generating element. In this apparatus, a voltage is applied to displace the pressure generating elements, so that the ink is ejected from the nozzles in the form of small droplets. FIG. 5 shows an example of the recording head, which constitutes the main part of the recording apparatus.

The head includes an ink channel (80) in communication with an ink chamber (not shown), an orifice plate (81) for ejecting ink droplets of desired volume, a vibration plate (82) for applying a pressure directly to the ink, a piezoelectric element (83) which is joined with the vibration plate (82) and which is displaced upon application of an electric signal, and a substrate (84) for supporting and securing the orifice plate (81), the vibration plate (82), and the like.

In FIG. 5, the ink channel (80) is formed of a photosensitive resin or similar material, and the orifice plate (81) is formed of a metal such as stainless steel or nickel. The orifice plate (81) is provided with an orifice (85), for example, by producing the orifice plate (81) by electroforming or by forming a hole in a metal plate by press working, and the orifice plate (81) is provided on its surface with an ink-repellant layer by composite coating of PTFE and nickel. The vibration plate (82) is formed of a metal film of stainless steel, nickel, titanium, or the like, a high modulus resin film, or the like, and the piezoelectric device (83) is formed of a dielectric material such as barium titanate or PZT. The recording head having the above constitution operates by applying a voltage pulse to the piezoelectric device (83) to generate distortion stress, whereby the energy generated deforms the vibrating plate joined to the piezoelectric device (83), to thereby press the ink in the ink channel (80) in vertical direction such that ink droplets (not shown) are ejected from the ink orifice (85) of the orifice plate (81) to accomplish the recording. Such recording head is used by incorporating in an inkjet recording apparatus similar to the one shown in FIG. 4 wherein various parts of the apparatus operates in a manner similar to the one as described above.

Figure 6:
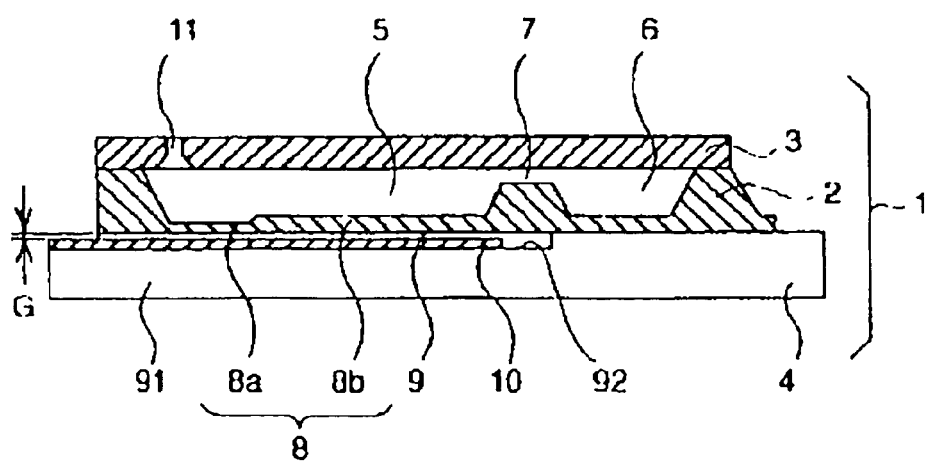
FIG. 6 is a cross sectional view of an example of the ink head wherein the present invention has been applied.

An inkjet apparatus using an electrostatic actuator is described as another preferable example of the inkjet recording apparatus utilizing mechanical energy. FIG. 6 is a cross-sectional view of an inkjet head to which the present invention has been applied. As shown in FIG. 6, an inkjet head (1) has a three layer structure in which a silicon substrate (2) is sandwiched between a nozzle plate (3) made of silicon on the upper side and a borosilicate glass substrate (4) having a coefficient of thermal expansion similar to that of silicon on the lower side. The intermediate silicon substrate (2) is formed with grooves which respectively function as a plurality of independent ink chambers (5), a shared ink chamber (6) shared by these independent ink chambers, and ink supply paths (7) for connecting the shared ink chamber (6) and the plurality of independent ink chambers (5), by etching the intermediate silicon substrate (2) from the surface (the upper side in FIG. 6). These grooves are covered with the nozzle plate to define the chambers and paths (5), (6) and (7).

The nozzle plate (3) is formed with an ink nozzle (11) at the position corresponding to the distal end portion of the respective ink chamber (5), and this ink nozzle (11) is in communication with the corresponding ink chamber (5). The nozzle plate (3) is also formed with an ink supply port which is in communication with the shared ink chamber. The ink is supplied from an external ink tank (not shown) to the shared ink chamber (6) through the ink supply port. The ink supplied to the shared ink chamber (6) is then supplied to the ink chambers (5) which are independent with each other through the ink supply path (7).

The ink chambers (5) has a bottom wall (8), and this bottom wall (8) is formed as a thin wall so that this part may also act as a diaphragm that is elastically displaceable in vertical direction of FIG. 1. Accordingly, the part of this bottom wall (8) is also referred in the following description as a "diaphragm" for the convenience of description.

The silicon substrate (2) is in contact with the underlying glass substrate (4), and the upper surface of the silicon substrate (2) that is in contact with the silicon substrate (2) is formed with shallow recesses (9). The recesses (9) are formed by etching at positions corresponding to the ink chambers (5) of the silicon substrate (2). Therefore, the bottom wall (8) of each ink chamber (5) opposes to the surface (92) of the recess (9) formed in the glass substrate (4) with an intervening very small gap. Since the recess (9) in the glass substrate (4) opposes the bottom wall (8) of the ink chamber (5), the wall of the recess (9) is also referred to as a "vibration plate opposing wall", or simply, as an "opposing wall" (91).

In this example, the bottom wall (8) of each ink chamber (5) functions as an electrode for storing electric charges. A segment electrode (10) is formed on the surface (92) of the recess (9) of the glass substrate (4), and this segment electrode (10) opposes the bottom wall (8) of each ink chamber (5). The surface of each segment electrode (10) is covered with an insulating layer having a thickness of G0 made of an inorganic glass. Accordingly, the segment electrode (10) and the bottom wall (8) of each ink chamber constitute counter electrodes with the intervening insulating layer (9) (with the distance between the electrodes being "G").

Next, the present invention is described in further detail by referring to the following Examples.

EXAMPLE 1

The composition of the formulation as described below was mixed and stirred. To the mixture was added 0.5 parts by weight of 1-amino-2,3-propanediol to adjust pH to 9.0.

The mixture was filtered through a 0.8 μm polypropylene filter to thereby produce a black ink.

| | |
|---|---|
| Carbon black dispersion 1 | 26.7 parts by weight |
| Bicine | 0.5 parts by weight |
| Diethylene glycol | 10 parts by weight |
| Glycerin | 5 parts by weight |
| 2-pyrrolidone | 10 parts by weight |
| 2-ethyl-1,3-hexanediol | 3 parts by weight |
| Ion exchanged water | 44.3 parts by weight |

EXAMPLE 2

The composition of the formulation as described below was mixed and stirred. To the mixture was added 0.5 parts by weight of 1-methylamino-2,3-propanediol to adjust pH to 9.5. The mixture was filtered through a 0.8 μm polypropylene filter to thereby produce a black ink.

| | |
|---|---|
| Carbon black dispersion 2 | 26.7 parts by weight |
| Tricine | 0.5 parts by weight |
| Diethylene glycol | 10 parts by weight |
| Glycerin | 5 parts by weight |
| 2-pyrrolidone | 10 parts by weight |
| 2-ethyl-1,3-hexanediol | 3 parts by weight |
| Ion exchanged water | 44.3 parts by weight |

EXAMPLE 3

The composition of the formulation as described below was mixed and stirred. To the mixture was added 0.3 parts by weight of 2-amino-2-methyl-1,3-propanediol to adjust pH to 9.5. The mixture was filtered through a 0.8 μm polypropylene filter to thereby produce a black ink.
Carbon black dispersion 3 26.7 parts by weight

| | |
|---|---|
| CAPSO | 0.5 parts by weight |
| Diethylene glycol | 10 parts by weight |
| Glycerin | 5 parts by weight |
| 2-pyrrolidone | 10 parts by weight |
| 2-ethyl-1,3-hexanediol | 3 parts by weight |
| Ion exchanged water | 44.5 parts by weight |

EXAMPLE 4

The composition of the formulation as described below was mixed and stirred. To the mixture was added 0.8 parts by weight of 2-amino-2-ethyl-1,3-propanediol to adjust pH to 10.0. The mixture was filtered through a 0.8 μm polypropylene filter to thereby produce a black ink.

| | |
|---|---|
| Carbon black dispersion 4 | 26.7 parts by weight |
| CAPS | 0.5 parts by weight |
| Diethylene glycol | 10 parts by weight |
| Glycerin | 5 parts by weight |
| 2-pyrrolidone | 10 parts by weight |
| 2-ethyl-1,3-hexanediol | 3 parts by weight |
| Ion exchanged water | 44.0 parts by weight |

EXAMPLE 5

The composition of the formulation as described below was mixed and stirred. To the mixture was added 0.8 parts by weight of 2-amino-2-ethyl-1,3-propanediol to adjust pH to 10.0. The mixture was filtered through a 0.8 μm polypropylene filter to thereby produce a black ink.
Carbon black dispersion 4 26.7 parts by weight

| | |
|---|---|
| TAPS | 0.5 parts by weight |
| Diethylene glycol | 10 parts by weight |
| Glycerin | 5 parts by weight |
| 2-pyrrolidone | 10 parts by weight |
| 2-ethyl-1,3-hexanediol | 3 parts by weight |
| Ion exchanged water | 44.0 parts by weight |

EXAMPLE 6

The composition of the formulation as described below was mixed and stirred. To the mixture was added 0.8 parts by weight of 2-amino-2-ethyl-1,3-propanediol to adjust pH to 10.0. The mixture was filtered through a 0.8 μm polypropylene filter to thereby produce a black ink.

| | |
|---|---|
| Carbon black dispersion 4 | 26.7 parts by weight |
| CHES | 0.5 parts by weight |
| Diethylene glycol | 10 parts by weight |
| Glycerin | 5 parts by weight |
| 2-pyrrolidone | 10 parts by weight |
| 2-ethyl-1,3-hexanediol | 3 parts by weight |
| Ion exchanged water | 44.0 parts by weight |

EXAMPLE 7

The composition of the formulation as described below was mixed and stirred. To the mixture was added 0.5 parts by weight of 2-amino-2-ethyl-1,3-propanediol to adjust pH to 9.0. The mixture was filtered through a 0.8 μm polypropylene filter to thereby produce a black ink.

| | |
|---|---|
| Yellow dispersion 1 | 20 parts by weight |
| CAPS | 0.2 parts by weight |
| Diethylene glycol | 10 parts by weight |
| Glycerin | 5 parts by weight |
| 2-pyrrolidone | 10 parts by weight |
| 2-ethyl-1,3-hexanediol | 3 parts by weight |
| Ion exchanged water | 51.3 parts by weight |

EXAMPLE 8

The composition of the formulation as described below was mixed and stirred. To the mixture was added 0.9 parts by weight of 2-amino-2-methyl-1,3-propanediol to adjust pH to 10.5. The mixture was filtered through a 0.8 μm polypropylene filter to thereby produce a magenta ink.

| | |
|---|---|
| Magenta dispersion 1 | 20 parts by weight |
| CAPSO | 0.1 parts by weight |
| Diethylene glycol | 10 parts by weight |
| Glycerin | 5 parts by weight |
| 2-pyrrolidone | 10 parts by weight |
| 2-ethyl-1,3-hexanediol | 3 parts by weight |
| Ion exchanged water | 51.0 parts by weight |

EXAMPLE 9

The composition of the formulation as described below was mixed and stirred. To the mixture was added 0.3 parts by weight of 1-methylamino-2,3-propanediol to adjust pH to 9.5. The mixture was filtered through a 0.8 μm polypropylene filter to thereby produce a cyan ink.

| Cyan dispersion 1 | 20 parts by weight |
|---|---|
| Bicine | 0.5 parts by weight |
| Diethylene glycol | 10 parts by weight |
| Glycerin | 5 parts by weight |
| 2-pyrrolidone | 10 parts by weight |
| 2-ethyl-1,3-hexanediol | 3 parts by weight |
| Ion exchanged water | 51.2 parts by weight |

COMPARATIVE EXAMPLE 1

The procedure of Example 1 was repeated except that 0.5 parts by weight of Bicine was not added to thereby produce a black ink having a pH of 9.0.

COMPARATIVE EXAMPLE 2

The procedure of Example 2 was repeated except that 0.5 parts by weight of Tricine was not added to thereby produce a black ink having a pH of 9.5.

COMPARATIVE EXAMPLE 3

The procedure of Example 3 was repeated except that 0.5 parts by weight of CAPSO was not added to thereby produce a black ink having a pH of 9.5.

COMPARATIVE EXAMPLE 4

The procedure of Example 4 was repeated except 0.8 parts by weight of 2-amino-2-ethyl-1,3-propanediol was replaced with 0.5 parts by weight of lithium hydroxide to thereby produce a black ink having a pH of 10.0.

COMPARATIVE EXAMPLE 5

The procedure of Example 5 was repeated except 0.8 parts by weight of 2-amino-2-ethyl-1,3-propanediol was replaced with 0.5 parts by weight of lithium hydroxide to thereby produce a black ink having a pH of 10.0.

COMPARATIVE EXAMPLE 6

The procedure of Example 6 was repeated except 0.8 parts by weight of 2-amino-2-ethyl-1,3-propanediol was replaced with 0.5 parts by weight of lithium hydroxide to thereby produce a black ink having a pH of 10.0.

COMPARATIVE EXAMPLE 7

The procedure of Example 7 was repeated except that 0.2 parts by weight of CAPSO was not added to thereby produce a black ink having a pH of 9.0.

COMPARATIVE EXAMPLE 8

The procedure of Example 8 was repeated except 0.9 parts by weight of 2-amino-2-methyl-1,3-propanediol was replaced with 0.6 parts by weight of sodium hydroxide to thereby produce a magenta ink having a pH of 10.5.

COMPARATIVE EXAMPLE 9

The procedure of Example 9 was repeated except 0.3 parts by weight of 1-methyl-amino-2,3-propanediol was replaced with 0.2 parts by weight of triethanol amine to thereby produce a cyan ink having a pH of 9.5.

COMPARATIVE EXAMPLE 10

The procedure of Example 4 was repeated except 0.8 parts by weight of 2-amino-2-ethyl-1,3-propanediol was replaced with 0.5 parts by weight of tris(hydroxymethyl)-aminomethane to thereby produce a black ink having a pH of 10.0.

The thus produced inks were evaluated for initial viscosity and average particle size, and properties as described below.

The printer used for the evaluation was the one having a PZT driven head with a nozzle of the diameter of 30 μm. The ink was deaerated and charged in a cartridge, and after initial test printing, the printer was left in an environment for 1 month at a temperature of 50° C. and a relative humidity of 60% with the ink remaining in the printer. The ink was then collected from the cartridge to evaluate the pH of the ink after storage, amount of Ni and Si dissolved in the ink after the storage, and change in the viscosity and the average particle size. The results are shown in Table 1. The change in the viscosity and the average particle size were evaluated to be: "excellent" when the change was less than 5%, "fair" when the change was 5% or more and less than 10%, and "fail" when the change was 10% or more.

TABLE 1

| | Initial pH | pH after storage | Dissolved Ni (ppm) | Dissolved Si (ppm) | Change in viscosity | Change in average particle size |
|---|---|---|---|---|---|---|
| Ex. 1 | 9.0 | 8.8 | 0.41 | 18.5 | excellent | excellent |
| Ex. 2 | 9.5 | 9.1 | 0.36 | 0.79 | excellent | excellent |
| Ex. 3 | 9.5 | 9.4 | 0.29 | 0.44 | excellent | excellent |
| Ex. 4 | 10.0 | 9.9 | 0.18 | 0 | excellent | excellent |
| Ex. 5 | 10.0 | 9.9 | 0.25 | 0.10 | excellent | excellent |
| Ex. 6 | 10.0 | 9.9 | 0.20 | 0 | excellent | excellent |
| Ex. 7 | 9.0 | 9.0 | 0.28 | 11.1 | excellent | excellent |
| Ex. 8 | 10.5 | 10.3 | 0.09 | 0 | excellent | excellent |
| Ex. 9 | 9.5 | 9.4 | 0.20 | 0.31 | excellent | excellent |
| Comp. Ex. 1 | 9.0 | 7.8 | 0.85 | 219.0 | fair | fair |
| Comp. Ex. 2 | 9.5 | 8.0 | 0.72 | 186.9 | fair | fair |
| Comp. Ex. 3 | 9.5 | 8.2 | 0.65 | 154.1 | fair | fair |
| Comp. Ex. 4 | 10.0 | 8.7 | 37.8 | 48.7 | fair | fair |
| Comp. Ex. 5 | 10.0 | 8.9 | 30.2 | 39.5 | fair | fair |
| Comp. Ex. 6 | 10.0 | 8.8 | 36.0 | 41.9 | fair | fair |
| Comp. Ex. 7 | 9.0 | 7.6 | 0.59 | 130.2 | fair | fair |

TABLE 1-continued

|  | Initial pH | pH after storage | Dissolved Ni (ppm) | Dissolved Si (ppm) | Change in viscosity | Change in average particle size |
|---|---|---|---|---|---|---|
| Comp. Ex. 8 | 10.5 | 8.9 | 108.3 | 39.0 | fair | fair |
| Comp. Ex. 9 | 9.5 | 8.1 | 5.2 | 183.8 | fair | fair |
| Comp. Ex. 10 | 10.0 | 9.4 | 0.45 | 0.50 | fail | fail |

What is claimed is:

1. A water-based ink, comprising:
   a surface treated pigment as a coloring material;
   a water-soluble organic solvent for dispersing the pigment;
   water for dispersing the pigment;
   an organic pH buffer selected from Good's buffers; and
   a compound selected from the group of aminopropanediol derivatives consisting of 1-amino-2,3-propanediol, 1-methylamino-2,3-propanediol, 2-amino-2-methyl-1,3-propanediol, and 2-amino-2-ethyl-1,3-propanediol,
   wherein the organic pH buffer selected from Good's buffers is selected from the group consisting of N-cyclohexyl-3-aminopropanesulfonic acid, N-cyclohexyl-2-hydroxy-3-aminopropanesulfonic acid, N-cyclohexyl-2-amino-ethanesulfonic acid, N-tris (hydroxymethyl)methyl-3-aminopropanesulfonic acid, N,N-bis (2-hydroxyethyl)glycine, and N-tris (hydroxymethyl)methylglycine.

2. A water-based ink according to claim 1, wherein the ink has a pH of 8 to 11.

3. A water-based ink according to claim 1, wherein the surface treated pigment is a self-dispersing pigment.

4. A water-based ink according to any one of claims 1, 2 and 3, wherein the ink is used in an inkjet printer having a unit wherein at least a member constituting the unit comprises a material containing at least one of silicon and nickel, wherein the unit is selected from the group consisting of a liquid chamber, a fluid resistor, a vibration plate, and a nozzle.

5. An inkjet recording process, comprising ejecting an ink against a recording material, wherein the ink is an ink of any one of claims 1, 4 and 3.

6. An ink cartridge, comprising:
   an ink; and
   an ink-accommodating section accommodating the ink, wherein the ink is an ink of any one of claims 1, 4 and 3.

7. A recording unit, comprising:
   an ink;
   an ink-accommodating section accommodating the ink; and
   a head section for ejecting a droplet of the ink, wherein the ink is an ink of any one of claims 1, 4 and 3.

8. An inkjet recording apparatus, comprising a recording unit, the recording unit comprising:
   an ink;
   an ink-accommodating section accommodating the ink; and
   a head section for ejecting a droplet of the ink, wherein the ink is an ink of any one of claims 1, 4 and 3.

* * * * *